United States Patent [19]

Millet et al.

[11] Patent Number: 5,410,828
[45] Date of Patent: May 2, 1995

[54] IDENTIFICATION DEVICE FOR A CONDUCTOR

[75] Inventors: Jean-Marie Millet, Ruffey Les Echirey; Daniel Makuc, Dijon, both of France

[73] Assignee: Telemecanique, Rueil-Malmaison, France

[21] Appl. No.: 6,130

[22] Filed: Jan. 19, 1993

[30] Foreign Application Priority Data

Jan. 22, 1992 [FR] France ................. 92 00684

[51] Int. Cl.[6] ............................................. G09F 3/00
[52] U.S. Cl. .................................. 40/316; 24/545; 40/665
[58] Field of Search ............... 40/306, 316, 317, 334, 40/665; 24/339, 543, 545; 439/491

[56] References Cited

U.S. PATENT DOCUMENTS

| 4,363,180 | 12/1982 | Lucas et al. | 40/316 |
| 4,649,658 | 3/1987 | Sarton et al. | 40/316 |
| 5,157,853 | 10/1992 | Piana et al. | 40/316 |

FOREIGN PATENT DOCUMENTS

| 51808 | 5/1943 | France . | |
| 633468 | 9/1931 | Germany . | |
| 474129 | 7/1969 | Switzerland | 40/316 |
| 9010284 | 9/1990 | WIPO | 40/316 |

*Primary Examiner*—Brian K. Green
*Attorney, Agent, or Firm*—Young & Thompson

[57] ABSTRACT

An identification device for an electrical cable, optical conductor, or pneumatic pipe includes a sleeve (11) carrying or protecting an identifying element. A stopping element (15) is firmly attached to the sleeve (11) and has a hook (18) which acts as a resilient link shaped to fit around a portion of a jacket (13) surrounding the cable, conductor, or pipe.

8 Claims, 2 Drawing Sheets

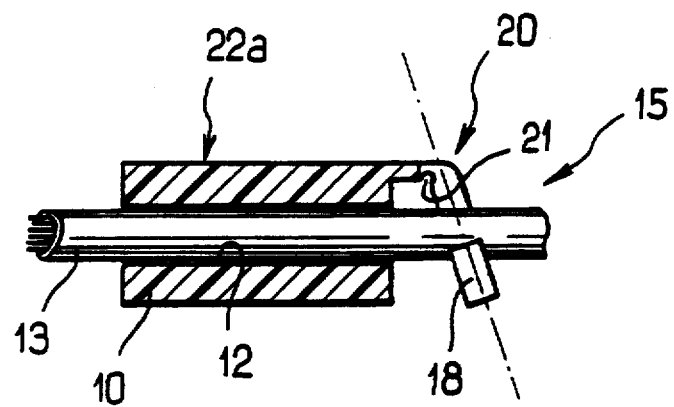
FIG_10

IDENTIFICATION DEVICE FOR A CONDUCTOR

FIELD OF THE INVENTION

The present invention relates to an identification device for a conductor, cable or pipe which may, for example, be electrical, optical or pneumatic, comprising a sleeve-shaped support which has an axial passage of shape adapted to that of the jacket of the cable to be identified and which carries at least one identifying element. In order to simplify matters, the single term "cable" will be used hereinbelow.

PRIOR ART

Such devices are well known and facilitate wiring whilst enabling each cable of an installation to be identified visually. When the axial passage of the sleeve has a diameter slightly greater than that of the jacket of the cable, in order to be able to slide over the latter freely or with easy slip, it is important to keep the identifier-carrying sleeve at the place which is assigned to it.

SUMMARY OF THE INVENTION

The object of the invention is thus effectively and simply to stop the sleeve of a device of the type described on the conductor, pipe or cable to be identified, whilst maintaining very simple identifying.

According to the invention, the device of the type described comprises an element for stopping the sleeve, firmly attached to the latter and including a hook of shape adapted to that of the cable in order to surround a portion of the perimeter of the jacket at a location of the latter left free by the sleeve. The hook is preferably connected in a pivoting and/or elastic manner to the remainder of the sleeve and it may advantageously be attached to a plate carrying or protecting the identifying element.

The stopping thus obtained is particularly simple and effective. It is advantageous for the stopping element to be firmly attached to the sleeve by means of at least one stud penetrating forcibly into a recess of the sleeve and possibly bearing directly on the jacket of the cable. The plate may, moreover, be molded flat together with the stopping hook.

BRIEF DESCRIPTION OF THE DRAWINGS

A non-limiting embodiment of the invention will now be described with reference to the attached drawings:

FIG. 10 represents diagrammatically an alternative embodiment of the invention

DESCRIPTION OF THE PREFERRED EMBODIMENTS

Figure 1:
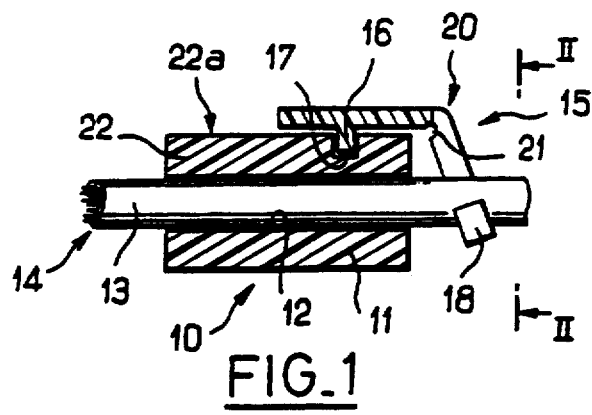
FIG. 1 shows, in axial section, an identifier carrier according to the invention.
Figure 2:
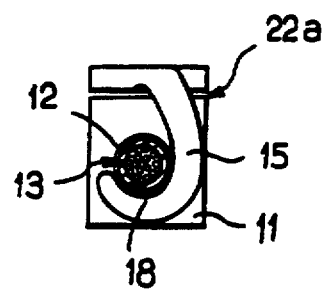
FIG. 2 is the section II—II of the identifier carrier of FIG. 1.

The identification device, or identifier carrier 10, illustrated by FIG. 1, comprises a support 11 in the form of a cylindrical or parallelepipedal sleeve provided with an axial passage 12 which is cylindrical or has another shape adapted to the jacket 13 of a cable or conductor 14 to be identified. The diameter of the passage 12 is slightly greater than that of the jacket 13 in order to enable the support 11 to slide freely or to with slight friction along the cable.

The identifier carrier 10 comprises a removable stopping element 15 which is firmly attached to the jacket by means of at least one stud 16 penetrating forcibly into a recess 17 of the sleeve. The firm attachment may also be carried out by a snap-fastening mechanism. The stopping element 15 includes a hook 18 of shape adapted to that of the jacket 13 of the cable. The hook surrounds the jacket, over a portion of its parameter, preferably over at least one half-turn and, for example, over approximately three quarters of a turn, at a location of the jacket which is left free by the sleeve, preferably at one end of the stopping element. The hooking effect is improved by the working position of the hook, which is oblique in relation to a plane transverse to the axis of the cable. The obliquity of the working position of the hook depends on the diameter of the cable on which the sleeve is disposed. The hook is smooth but, of course, it could be ribbed or notched.

The hook 18 is connected elastically to the stopping element 15. This elastic connection may be constituted by a suitable hinge 20 and/or by a narrowing 21 of the cross section of the element 15.

In the embodiment of FIG. 1, the identifier 22 is carried by the surface 22a of the support left free by the stopping element. In the preferred embodiments of FIGS. 3 and 4, the stopping element 15 forms an integral portion of a small identifier-bearing plate 23 (FIG. 4); in the case of FIG. 3, the plate 23 is opaque and carries the identifying identification 24; in the case of FIG. 4, the plate 23 is transparent and covers an identifying label 25. In both cases, the plate has studs 16 for positioning on the sleeve which in addition are applied directly against the cable in order to contribute to the stopping of the sleeve. The recesses 17 are then provided to pass right through to the passage 12.

Figure 3:
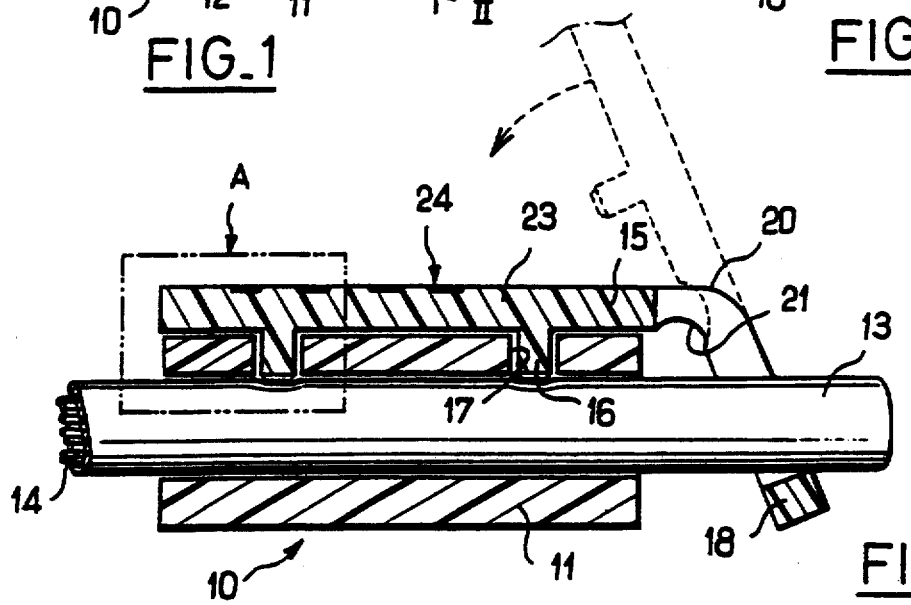
FIG. 3 is an axial section of a preferred embodiment of the identifier carrier.
Figure 4:
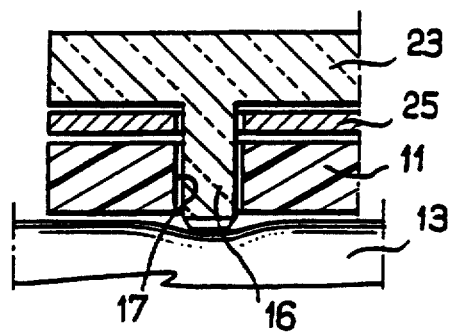
FIG. 4 represents, on a larger scale, the detail A of FIG. 3 in an alternative embodiment.
Figure 9:
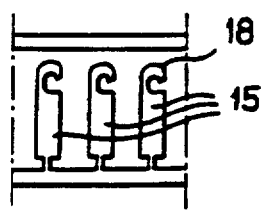
FIG. 9 is a partial view of a hook-plate strip.
Figure 5:
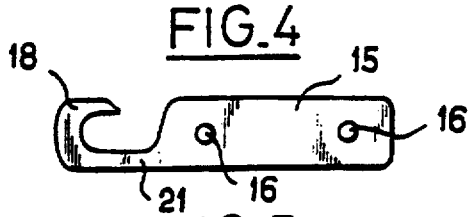
FIG. 5 and 6 show in plan view two embodiments of the hook plate.
Figure 6:
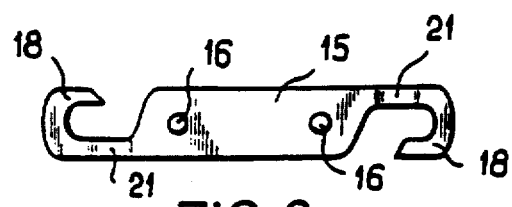
Figure 7:
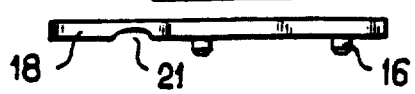
FIG. 7 and 8 are corresponding elevations.
Figure 8:
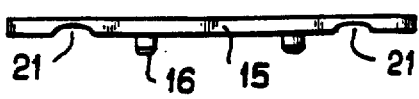

It is advantageous for the hook 18 to be molded flat together with the plate 23 (FIGS. 5 to 8) and for it to be able to be manufactured simply in strip form (FIG. 9). The plate 23 comprises a single hook (FIGS. 5 and 7) or two hooks (FIGS. 6 and 8). As indicated in FIG. 3 by the dashed lines in the case of a plate having a single hook, the hook is firstly passed around a cable and then the plate is inclined towards the sleeve in order to be positioned and snap fastened by virtue of the penetration and the retention of the studs 16 in the recesses 17. Any one type of plate may interact with sleeves of various types, designed for cables of different diameters.

The sleeve 11 of the identifier carrier described may form a portion of a conducting end-piece having an insulating skirt in which end-piece the end of the cable is gripped and the sleeve 11 of which constitutes a portion which can be cut.

In an alternative embodiment of the invention, represented in FIG. 10, the hook is attached directly to the body of the sleeve by the hinge 20 and/or the narrowing 21. In the absence of a detachable stopping element or of a plate 23, the identifiers are then carried directly by the outer surface 22a of the sleeve. In this case the hook is, for example, molded flat together with the sleeve and bent when it is mounted on the cable.

The invention, described in terms of the identifying of an electrical cable, is applicable to the identifying of optical conductors or pneumatic pipes.

We claim:

1. Identification device for a conductor, pipe or cable having a jacket, comprising:
   a sleeve-shaped support having therethrough an axial passage shaped to fit around a jacket of a cable to be identified, and
   a stopping element, which carries at least one identifying element and which is firmly attached to the sleeve-shaped support, said stopping element including a hook formed at one end of the stopping element as a resilient link in order that the hook in a working position surrounds at least a portion of a circumference of a jacket received in said axial passage at a location where the hook in the working position is forced against the portion of the circumference of the jacket so that axial motion of the sleeve-shaped support is stopped, and wherein the stopping element is attached in a detachable manner to the sleeve-shaped support by at least one sufficiently long stud means for penetrating forcibly through a bore extending through the sleeve-shaped support.

2. The device as set forth in claim 1, wherein the stopping element has a portion forming a plate means for carrying the identifying element.

3. The device as set forth in claim 1, wherein the stud means extends into said axial passage.

4. The device as set forth in claim 1, wherein the hook is connected to a remainder of the stopping element by a hinge of narrowed cross section.

5. The device as set forth in claim 1, wherein the hook is directly linked by a remainder of the stopping element in a pivoting elastic manner to the sleeve-shaped support.

6. The device as set forth in claim 5, wherein the hook is connected to the remainder of the stopping element by a hinge of narrowed cross section.

7. The device as set forth in claim 5, wherein the hook is molded flat together with the sleeve-shaped support and is bent when being mounted around the jacket of the cable.

8. The device as set forth in claim 1, wherein the hook is molded flat together with a plate means for carrying the identifying element, said plate means forming a portion of the stopping element and being bent when the hook is inserted on a jacket of a cable and also when the plate means is mounted on the sleeve-shaped support.

* * * * *